United States Patent
Ahrens et al.

(10) Patent No.: US 7,236,642 B2
(45) Date of Patent: Jun. 26, 2007

(54) METHOD AND STRUCTURE FOR GENERATING OUTPUT DATA OF A DIGITAL IMAGE INCLUDING A TRANSPARENT OBJECT

(75) Inventors: Kai Ahrens, Padenstedt-Kamp (DE); Dieter Loeschky, Hamburg (DE)

(73) Assignee: Sun Microsystems, Inc., Palo Alto, CA (US)

( * ) Notice: Subject to any disclaimer, the term of this patent is extended or adjusted under 35 U.S.C. 154(b) by 860 days.

(21) Appl. No.: 10/185,918

(22) Filed: Jun. 27, 2002

(65) Prior Publication Data

US 2003/0018817 A1    Jan. 23, 2003

(30) Foreign Application Priority Data

Jun. 28, 2001    (EP)    ................... 01115824

(51) Int. Cl.
*G06K 9/40*    (2006.01)
*G06K 9/36*    (2006.01)

(52) U.S. Cl. ................ 382/261; 382/283; 382/265

(58) Field of Classification Search ........ 382/168–172, 382/260–265, 283
See application file for complete search history.

(56) References Cited

U.S. PATENT DOCUMENTS 6,081,277 A * 6/2000 Kojima .................. 345/661
6,999,101 B1 * 2/2006 Sanborn et al. ......... 345/619

* cited by examiner

*Primary Examiner*—Matthew C. Bella
*Assistant Examiner*—Wes Tucker
(74) *Attorney, Agent, or Firm*—Gunnison, McKay & Hodgson, L.L.P.; Forrest Gunnison

(57) ABSTRACT

A method for generating output data for a transparent object in a digital image creates a plurality of image areas. The plurality of image areas covers a total area of the transparent object in the digital image. Each image area covers a different portion of the transparent object. The method combines information of the transparent object covered by an image area with information of a background image of the digital image also covered by the image area. The background image does not include the transparent object.

27 Claims, 13 Drawing Sheets

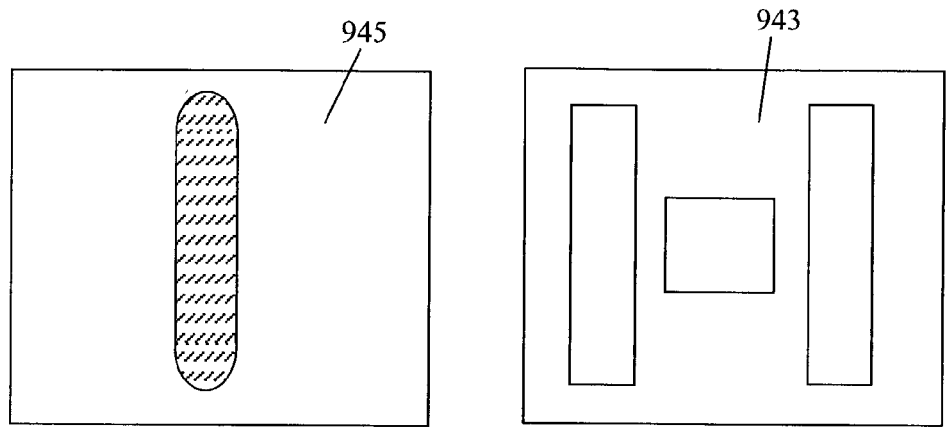
Fig. 9A
Fig. 9D
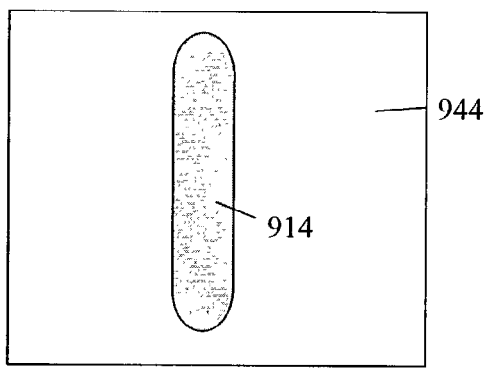
Fig. 9B
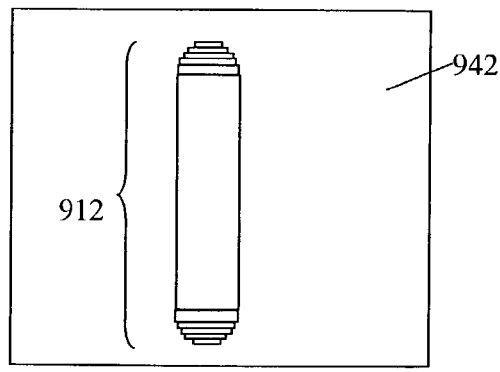
Fig. 9C

METHOD AND STRUCTURE FOR GENERATING OUTPUT DATA OF A DIGITAL IMAGE INCLUDING A TRANSPARENT OBJECT

BACKGROUND OF THE INVENTION

1. Field of the Invention

The present invention relates generally to processing digital images, and more particularly to a method, computer system and computer program for generating output data of a digital image that includes a transparent object.

2. Description of Related Art

A transparent object of a digital image is an object, which does not completely cover a background image behind the transparent object so that the background remains at least partially visible for a viewer. The transparency is defined as a combination of pixels of the transparent object itself with the pixels of the covered background.

The image information of one pixel is for example represented by four bytes (R, G, B, α), where R represents the intensity of the red color, G represents the intensity of the green color, B represents the intensity of the blue color, and α represents a transparency value. With this representation, every one of the three basic colors, red, green and blue, can be assigned one of 256 different intensity values.

The appearance of the pixel is defined by a superposition of all three-color intensities. The α value defines the transparency of a pixel, which can assume 256 values between completely opaque and completely transparent. In the following description, the term transparent is to be understood as covering all degrees of transparency apart from totally opaque.

FIG. 1 illustrates a first example of a digital image 100 that includes a transparent object 101. A background object 105 is covered by transparent object 101, but background object 105 remains at least partially visible to the viewer. The representation of the image area of transparent object 101 therefore requires a combination of the image information of transparent object 101 with the image information of background object 105.

On output devices like common raster displays transparency is displayed using a bitmap of the background image stored in a memory and combining the pixels of the background bitmap with the pixels of the transparent object itself, pixel by pixel. For example, a process flow diagram for a known method 200 of preparing output data for outputting a digital image including at least one transparent object on a display device is shown in FIG. 2.

In input operation 250, a transparent object is input using well known input devices like a keyboard or a mouse. Obtain object bitmap operation 251 retrieves a bitmap of the transparent object. Obtain background bitmap operation 252 retrieves the background bitmap comprising the digital image without the newly input transparent object from a display memory of the display device. In most display devices, such a display memory exists in which the bitmap of the previous image not yet including the latest drawing object is stored.

Combine bitmaps operation 253 creates a new bitmap for the transparent image by combining the transparent object bitmap with the background bitmap. A pixel-by-pixel combination of the two bitmaps is performed, and the image data of the background image are overwritten by the respective pixels of the new combined object. Upon completion of operation 253, transfer image data operation 254 sends the new bitmap including the transparent object as output data to the display device.

Method 200, which generates output data for a digital image including at least one transparent object, is applicable to a raster display like a cathode ray tube or liquid crystal display. This method, however, only works with so-called "blitable" devices having back transfer capability, which means that the output data of the previous version of the digital image not yet including the transparent object can be transferred back from the output device (e.g. display) to the computing device where the digital image has been generated.

Method 200 (FIG. 2) therefore cannot be used for most types of printer devices. Most printer drivers have no back transfer capabilities and do not offer the possibility to retrieve the bitmap from an earlier generated output, i.e. the previous image without the transparent object.

A common solution to this problem is a method 300 illustrated in FIG. 3. Operations 250 and 251 are the same as those in method 200 and so that description is incorporated herein by reference.

However, since the background bitmap cannot be transferred back from the output device, reconstruct background bitmap operation 301 reconstructs the background bitmap from a display command list which stores all display commands of the present digital image. Based on the stored background bitmap and the object bitmap, the output data is generated by a pixel-by-pixel combination in combine bitmaps operation 253. The resulting data are transferred in transfer image data operation 254 to an output device as for example a printer.

The main drawbacks of the method illustrated in FIG. 3 are large memory consumption for storing the bitmap for the combination process, sometimes called the rendering process, and the high bandwidth requirements for transferring the output image as a bitmap to the output device. Depending on the transparent object and the background large parts or even the complete display area have to be stored as a bitmap, rendered, and then transferred to the output device. This is in particular undesirable for printers like for example PostScript printers where every output pixel is represented in an ASCII mode. This means that every pixel of the bitmap is represented by characters, each requiring at least one byte of memory space.

The area of the digital image, which has to be stored as a bitmap for performing the combination process described above, is now shown by way of three different examples illustrated in FIGS. 1, 4 and 5.

Since a bitmap is a rectangular area, the image area to be rendered is at least a smallest rectangular area 102 completely covering the transparent object 101. In the example shown in FIG. 1, only object 105 is affected by the transparent object and is completely included in image area 102. Therefore, area 102 has to undergo the combination process.

In the example of FIG. 4, however, two background objects 403, 404 are partly covered by transparent object 401. The objects of a digital image 400, like objects 403, 404, are in an output file normally represented in a polygon representation, which means the image information is defined by display commands including the positions of the corner points of the object and the color of the object area. For larger objects, this representation requires much less memory space than a pixel-by-pixel bitmap representation. For generating the output file including a transparent object 401, however, the bitmap representation of the transparent object 401 as well as of the objects 403, 404 that are affected by transparent object 401 is necessary to avoid discontinuities of appearance. Therefore, the image area for which the combination process has to be carried out in the example of FIG. 4 is a rather large area 402. Memory consumption and bandwidth requirements therefore increase.

In the example of FIG. 5, digital image 500 includes a background 504, for example background color or background pattern. Digital image 500 may be, for example, a presentation slide having a background in the typical corporate design color, a text portion 508 and a logo 501, which in this example is the transparent object. Since transparent object 501 is positioned on background 504, the image area stored as a bitmap is complete digital image 500 because the background object is represented as one object in a typical output file. The memory and bandwidth requirements for carrying out the process of FIG. 3 in the example of FIG. 5 are therefore enormous.

SUMMARY OF THE INVENTION

According to an embodiment of the present invention, a method of processing transparent objects in a digital image reduces the memory, processing and network bandwidth requirements associated with displaying the transparent objects. In one embodiment of the method, a plurality of image areas is created. The plurality of image areas covers a total area of a transparent object in the digital image. Each image area covers a different portion of the transparent object.

The method combines information of the transparent object covered by an image area with information of a background image of the digital image also covered by the image area. The background image does not include the transparent object.

In one embodiment, each image area in the plurality of image areas is a rectangular area. The rectangular area is created by covering only pixels of the transparent object.

In another embodiment, the creating a plurality of image areas includes creating a number of image areas in the plurality of image areas. The number is a smallest number of image areas needed to cover only pixels of the transparent object.

To create the plurality of image areas, a mask bitmap having a masked area masking the area of the transparent object is used. The mask bitmap is horizontally scanned, and start positions and end positions of the masked area in lines of the mask bitmap are detected. The plurality of image areas is created by putting together pixels of adjacent lines having a common start position and a common end position to form an image area. In one embodiment, the masked area of the mask bitmap is comprised of black pixels and a remaining area is comprised of white pixels.

The combining of information includes a pixel-by-pixel combination of pixel data of the transparent object with respective pixel data of the background image. In one embodiment, a weight of a pixel of the transparent object and a weight of a respective pixel of the background image are determined by a transparency weight encoded in the pixel of the transparent object.

A further embodiment of the present invention provides a computer system for generating output data of a digital image including a transparent object. The computer system comprises a processing unit for defining a plurality of image areas, which together cover the area of the transparent object, and for combining image information of the transparent object with image information of a background image in every one of the plurality of image areas.

Embodiments of the present invention allow a reduction of the memory and bandwidth requirements for preparation and transmission of the output data. Only the image information of those areas of the background image, which are actually covered by the transparent object have to be stored in a bitmap, combined with the transparent object, and forwarded as bitmap data to the output device.

According to a particular embodiment, the image areas are rectangular bitmaps. The plurality of image areas represents, according to a particular embodiment, the smallest number of rectangular areas, which only include the pixels of the transparent object. The processing and transmission efficiency can thus be further optimized.

The image information of the transparent object may be obtained from an object bitmap containing the transparent object and the image information of the background image may be obtained from a background bitmap containing the background image not including the transparent object. The background bitmap may be retrieved from an output command list stored in a memory device.

According to a still further embodiment of the present invention, a plurality of rectangular bitmaps is generated using a mask bitmap masking the area of the transparent object. The mask bitmap may be formed of black pixels representing the transparent object and white pixels representing the remaining image area. The mask bitmap is a binary representation of the area of the transparent object, which requires less memory space than the bitmap representation of the digital image itself and simplifies the generation of the plurality of input areas covering the transparent object. The rectangular bitmaps are generated by horizontally scanning the mask bitmap, detecting the start and end positions of the masked area of the mask bitmap and putting together the pixels of adjacent lines with identical start and end positions to form the rectangular bitmap areas.

According to a still further embodiment, the combination of the image information of the transparent object with the image information of the background image comprises a pixel-by-pixel combination of the respective image data. The weights of the respective pixels of the transparent object and the background image are determined by a transparency value encoded in every pixel of the transparent object.

The output data may be prepared for any type of output device including a printer device, a display device, a memory device, etc. The output device may be connected to the computer system through a wire based or wireless or any other suitable communication link. The output data may be compressed before being transferred to the output device.

A further implementation of the present invention may be realized by a computer program for generating output data of a digital image containing a transparent object having executable program code for defining a plurality of image areas together covering the transparent object and combining in the plurality of image areas image information of the transparent object with image information of a background image.

A computer code may be embodied in any form of computer program product. A computer program product comprises a medium which stores or transports computer-readable code, or in which computer-readable code can be embedded. Some examples of computer program products are CD-ROM or DVD-ROM disks, ROM charts, floppy disks, magnetic tapes, computer hard drives, servers on a network or signals transmitted over the network representing a computer-readable program code.

BRIEF DESCRIPTION OF THE DRAWINGS

FIG. 9A is an illustration of a transparent object bitmap that is used in one embodiment of the present invention.

FIG. 9B is an illustration of a masked bitmap for the transparent object of FIG. 9A according to one embodiment of the present invention.

FIG. 9C is an illustration of image area bitmaps for the transparent object of FIG. 9A according to one embodiment of the present invention.

FIG. 9D is an illustration of a background image bitmap that is used in one embodiment of the present invention.

DETAILED DESCRIPTION

Figure 1:
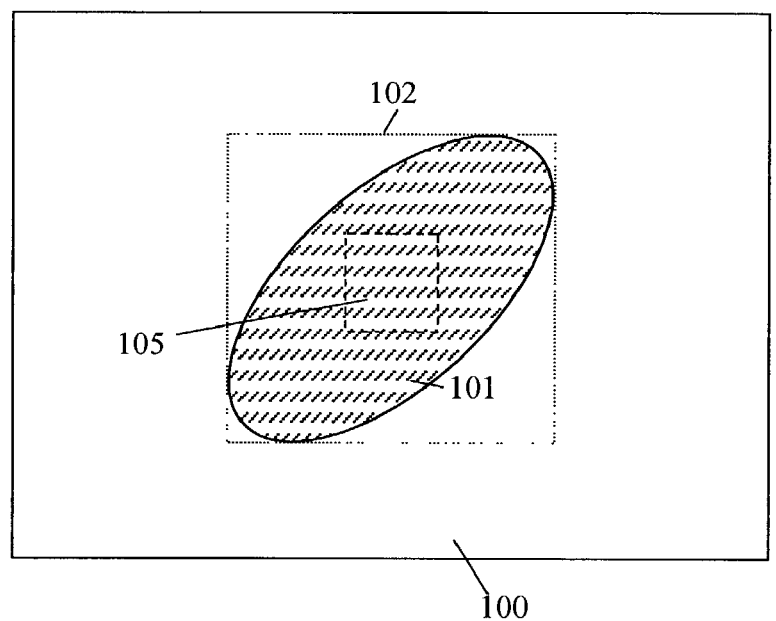
FIG. 1 is a schematic illustration of an exemplary digital image including a transparent object.
Figure 2:
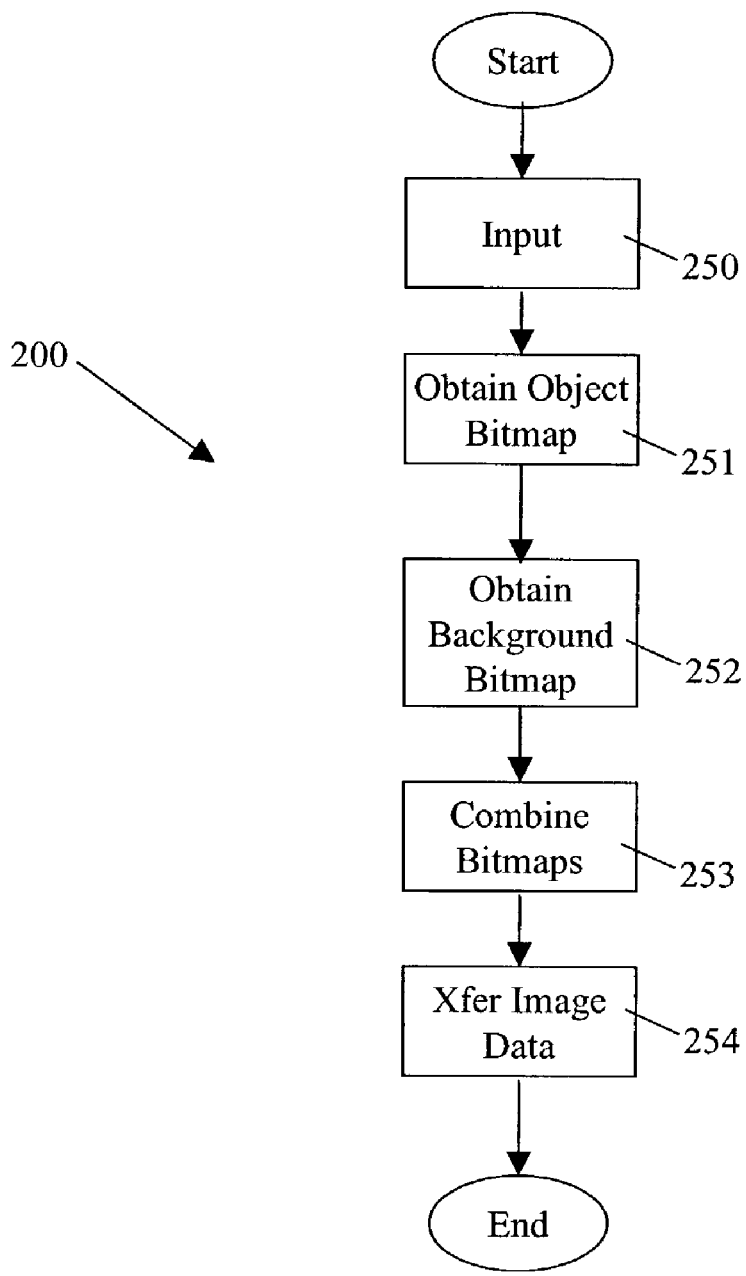
FIG. 2 is a flow chart illustrating a known process for preparing output data for outputting a digital image containing a transparent object on a raster display device.
Figure 3:
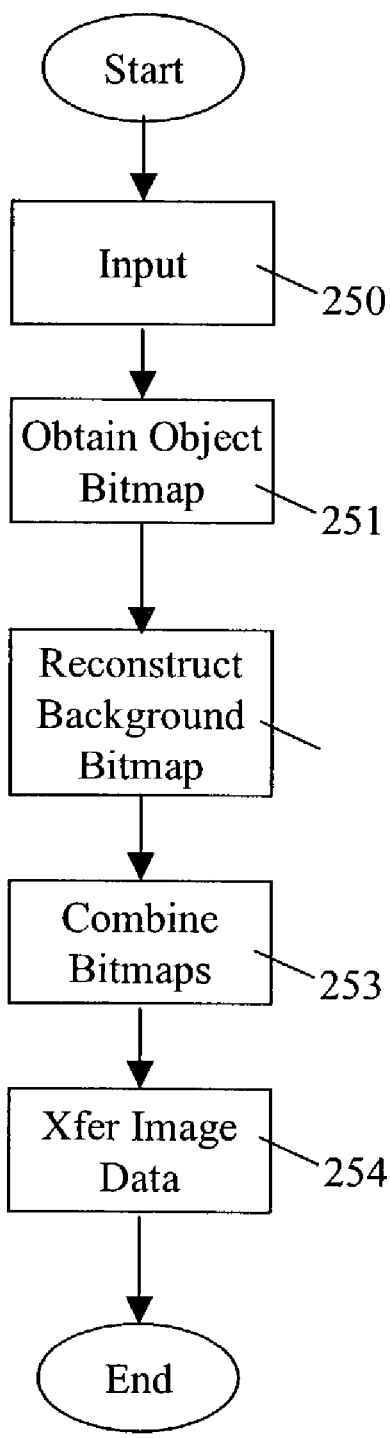
FIG. 3 is a flow chart illustrating a known process for preparing output data for outputting a digital image containing a transparent object on a printer device.
Figure 4:
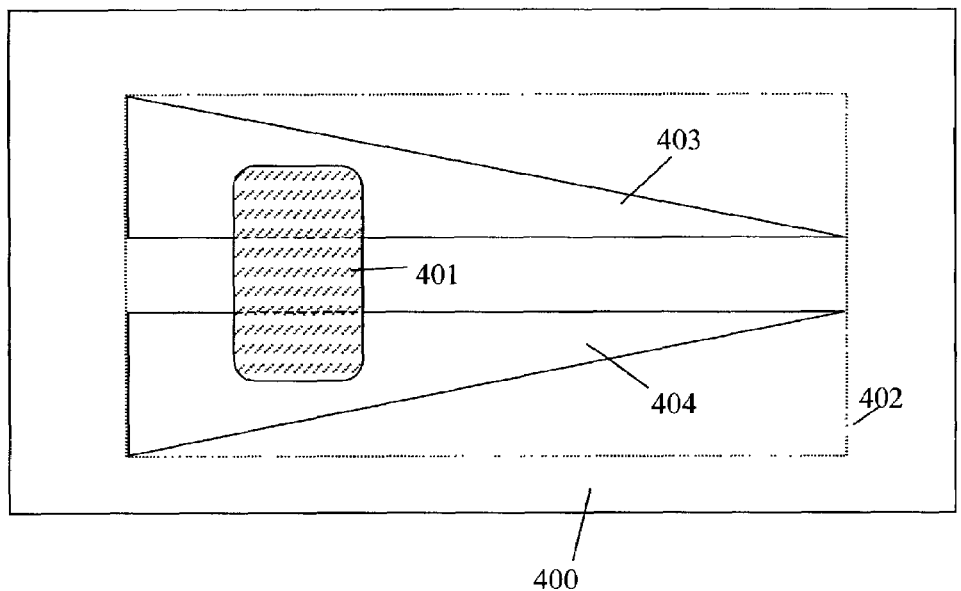
FIG. 4 is a schematic illustration of a further example of a digital image including a transparent object.
Figure 5:
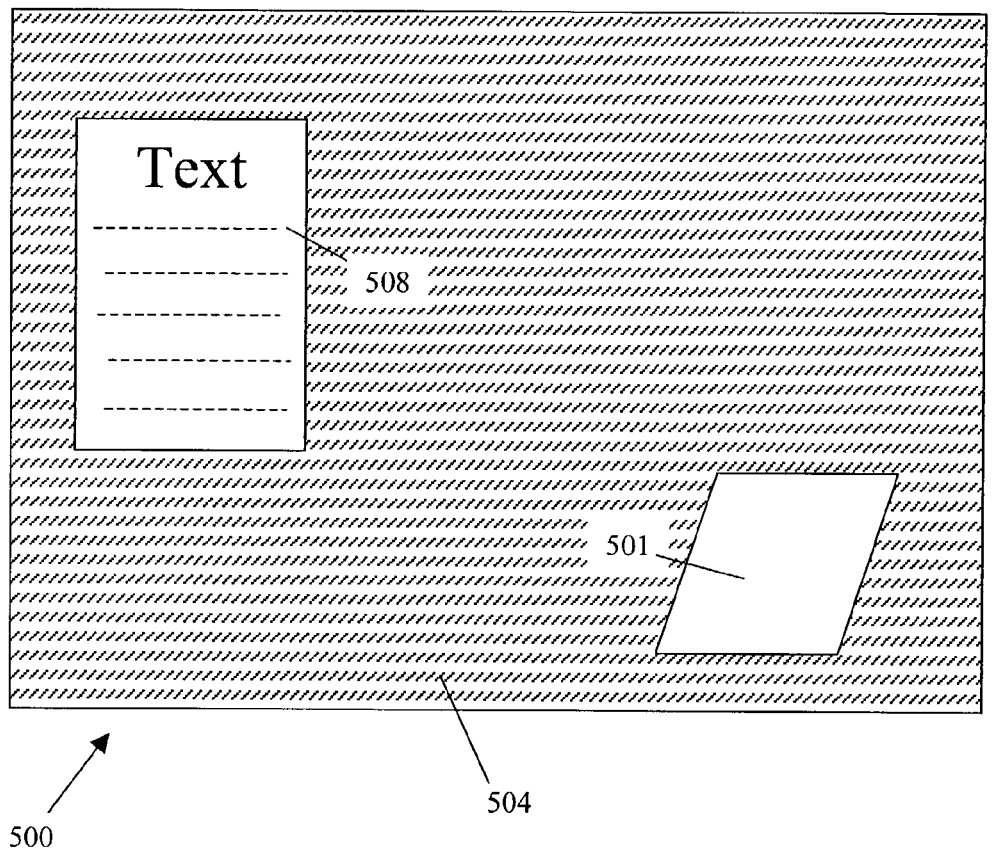
FIG. 5 is a schematic illustration of a still further example of a digital image including a transparent object.

In one embodiment of the present invention, a computer-based method 630 (FIG. 6A) is used to process a digital image 690 (FIG. 6B) including one or more transparent objects, e.g., transparent object 693. In this example, digital image 690 includes in addition to transparent object 693, a background object 694 that remains visible behind transparent object 693. Other background objects 691, 692 of digital image 690 are not affected by transparent object 693.

Figure 6A:
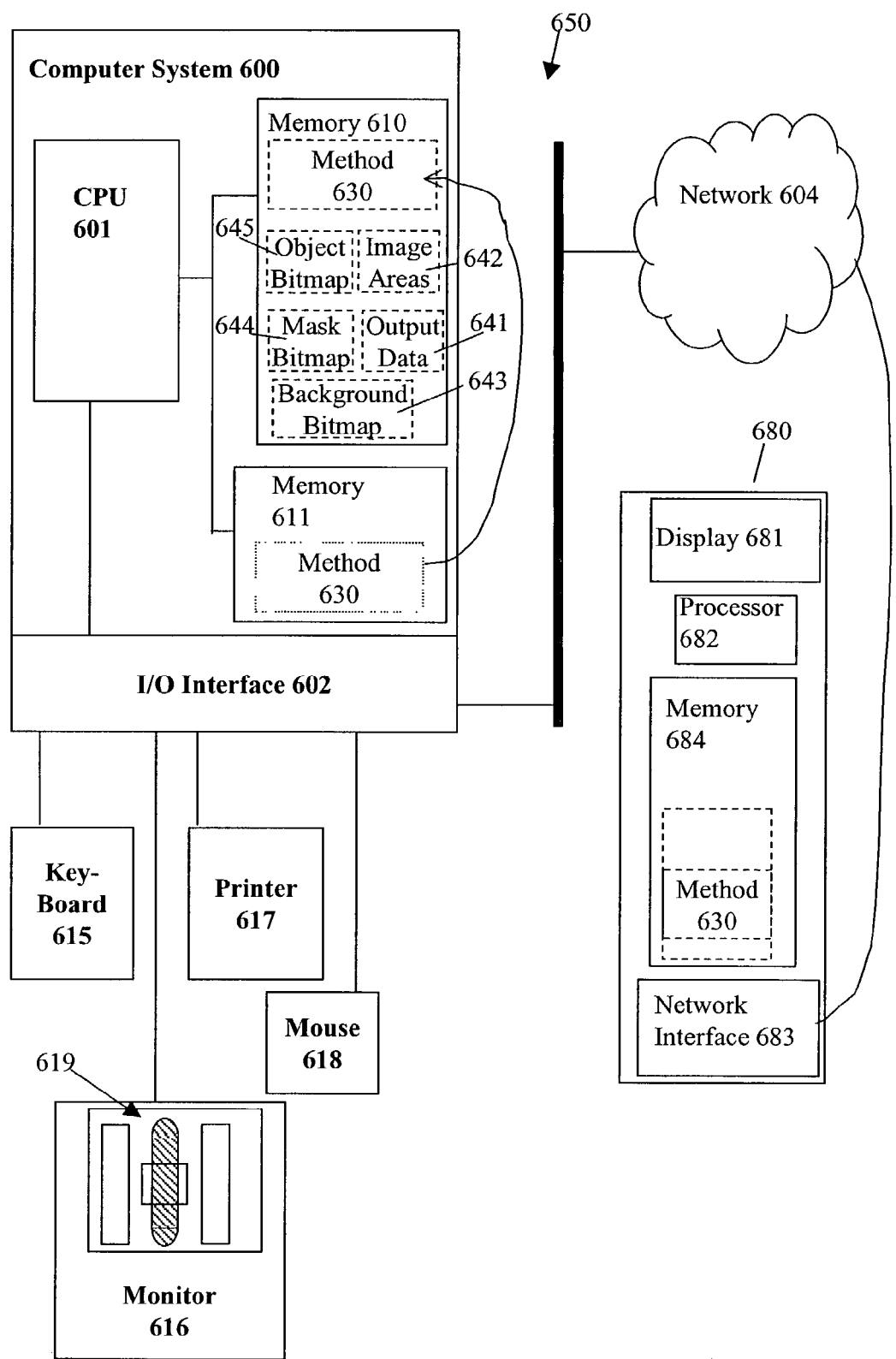
FIG. 6A is a block diagram of a system that includes one embodiment of a method of this invention and that executes the method in several different alternative embodiments.
Figure 6B:
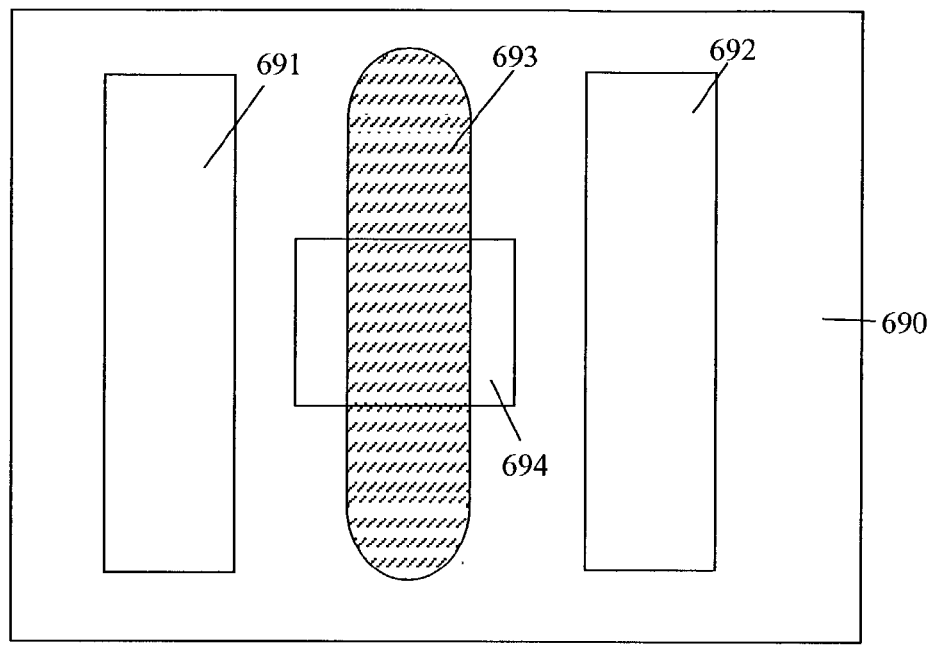
FIG. 6B is a schematic illustration of a digital image comprising a transparent object.

As explained more completely below, method 630 generates output data in image areas 642 carrying the information of digital image 690 with transparent object 693. The output data in image areas 642 is copied, or in some cases transmitted if the output device is remote, to the appropriate location in stored output data 641 for an output device like a printer 617, remote display or the like, more efficiently than the prior art processes. In FIG. 6A, the output data also is presented as display 619 on monitor 616, which is a remote display when method 630 executes on system 680.

Figure 7:
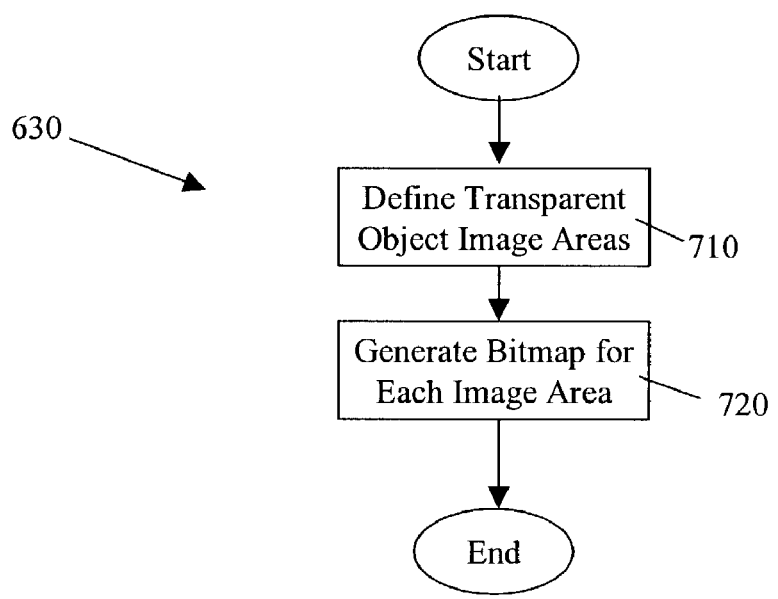
FIG. 7 is a process flow diagram illustrating a method of preparing output data for a transparent object and a corresponding portion of a background image of a digital image according to an embodiment of the present invention.

FIG. 7 is a high-level process flow diagram for one embodiment of method 630. In define transparent object image areas 710, a plurality of image areas are defined, which together cover the area of the transparent object, e.g. object 693.

In one embodiment, each image area is a rectangular area that is sized to include only a portion of object 693. Hence, the sum of the areas defined by the plurality of image areas includes the area of transparent object 693, e.g., covers transparent object 693, and approximates the area of transparent object 693. Upon completion of operation 710, processing transfers to generate bitmap for each image area operation 720

In operation 720, for each image area, the image information of transparent object 693 is combined with the corresponding image information of background image 694 and stored back in the image area. Since the image areas are selected to include and approximate the area of transparent object 693, the image area for which the combination processing of operation 720, sometimes called rendering, is carried out and the memory size of image areas 642 are reduced relative to the prior art processing methods. This increases memory, processing and transmission bandwidth efficiency.

Figure 8:
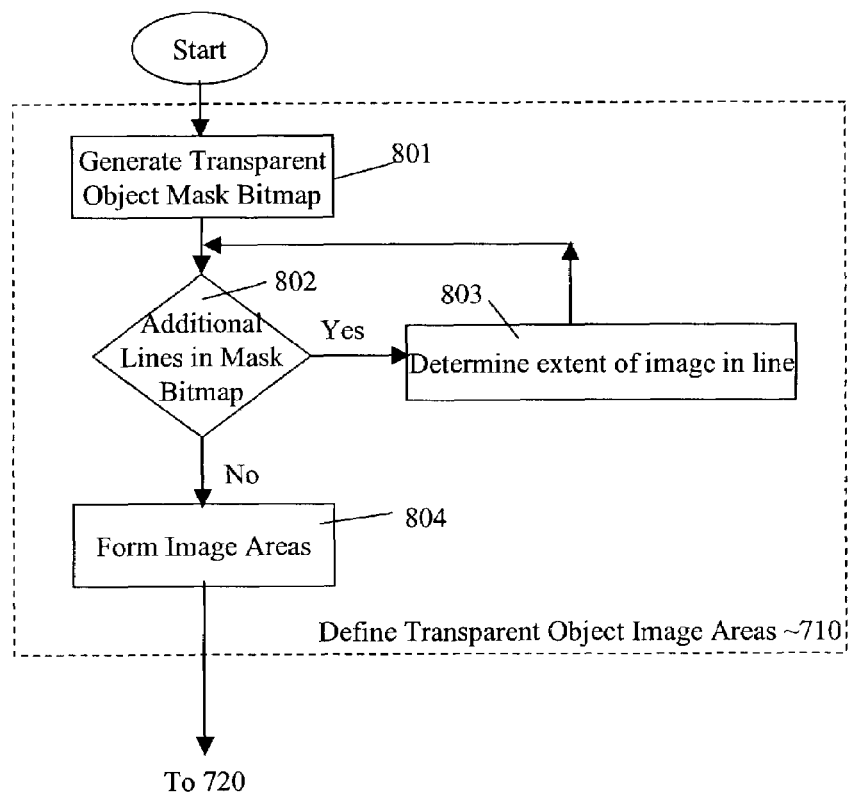
FIG. 8 is a more detailed process flow diagram illustrating a process of forming a plurality of image areas according to an embodiment of the present invention.

An example of a process flow diagram for define transparent object image areas operation 710 is presented in FIG. 8. In generate transparent object mask bitmap operation 801, a mask bitmap 944 (FIG. 9B) of transparent object 693 is created. Those of skill in the art appreciate that mask bitmap 944 is a graphic representation of information stored in memory 610 as mask bitmap 644.

As used herein, a mask bitmap is a bitmap covering the whole area of a digital image, wherein every pixel is represented as binary information, either black or white. In this embodiment, the mask bitmap includes a plurality of pixels arranged in a rectangular shape. For example, the bitmap has 512 lines each comprising 648 pixels thus forming a rectangular image area of a total of 512×648 pixels.

In mask bitmap 644, the area of a transparent object or a plurality of transparent objects is represented by black pixels and the remaining area of the bitmap by white pixels or conversely. Mask bitmap 944 (FIG. 9B) represents transparent object 693. Masked area 914 is made up of black pixels that cover the image area of transparent object 693.

Since the pixels of mask bitmap 944 utilize a binary representation, mask bitmap 944 requires much less memory space than a complete bitmap of the digital image itself. Furthermore, mask bitmap 944 allows simple detection of whether a pixel belongs to masked area 914 that is covered by transparent object 693.

Additional lines in mask bitmap check operation 802 determines whether all the lines in mask bitmap 944 have been processed. Since upon entry to check operation 802 no lines have been processed, check operation transfers to determine extent of masked area in line operation 803.

In operation 803, a first line of mask bitmap 944 is examined to determine the start and end positions of masked area 914 in that line. This process is performed by determining where the pixels in the line change state, e.g., where the pixels change from black to white or conversely. In this example, the pixels in the first line all have the same state, and so no information is recorded with respect to transparent object 693 and operation 803 returns to additional lines in bitmap check operation 802.

Since there are still additional lines to be processed in mask bitmap 944, check operation 802 again transfers to operation 803, which in turn determines the start and end points of masked area 914 in the next line of mask bitmap 944.

Hence, when check operation 802 transfers to form image areas operation 804, mask bitmap 944 has been scanned horizontally, and the start and end positions of masked area 914 in each line has been recorded. The use of a single transparent object is illustrative only and is not intended to limit operation 710 to such an embodiment. Operation 710 works in the same way if multiple transparent objects are included in the digital image.

In form image areas operation 804, the respective image areas are formed by defining rectangles that include adjacent lines for which identical start and end positions on the mask bitmap have been detected. These rectangles are the transparent object image areas in this embodiment, and are stored in memory 610 as image areas 642. Upon completion of operation 804, image areas for the transparent object or the plurality of transparent objects in the digital image have been generated. In one embodiment, each of these image areas is a bitmap.

Figure 10:
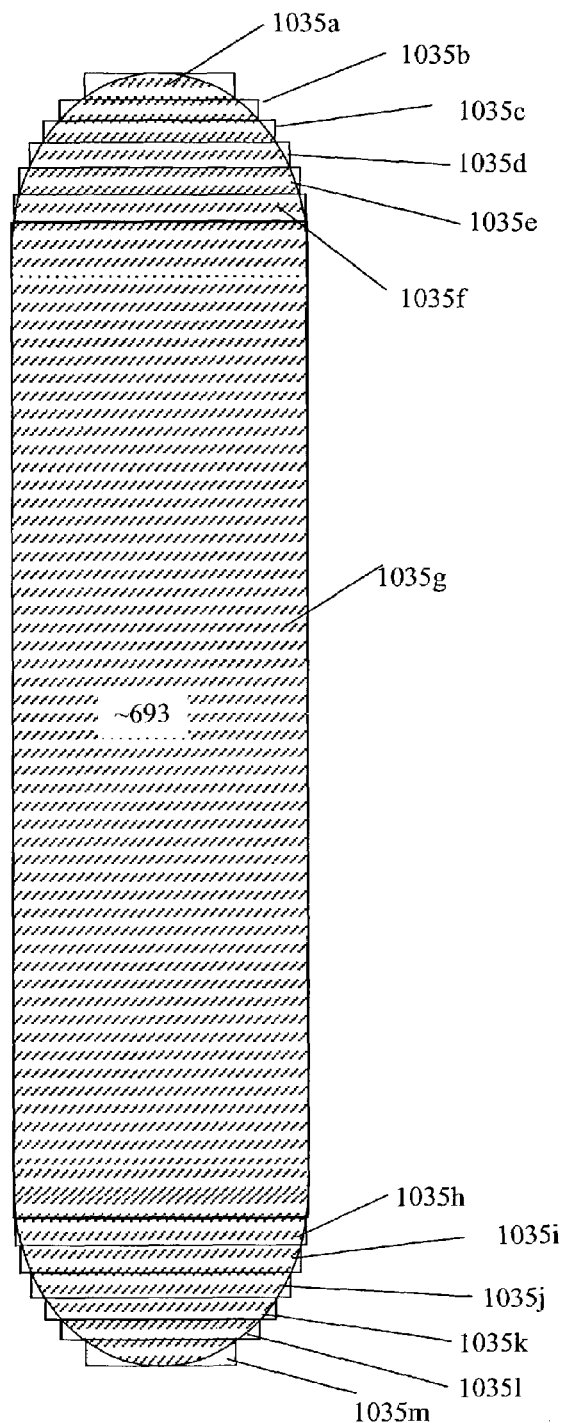
FIG. 10 is a more detailed diagram showing the image area bitmaps for the transparent object of FIG. 6B according to an embodiment of the present invention.

FIG. 9C is a graphic representation 942 of the information in image areas 642 for transparent object 693. FIG. 10 is a more detailed illustration of image areas 1035a to 1035m for transparent object 693. Since the image areas have a rectangular shape, curved areas in mask bitmap 944 may result in an image area covering only one single line. Areas in which the outlines of the transparent object are substantially vertical result in larger bitmap areas like bitmap area 1305g.

An example of the process of combining, e.g., rendering, the image information of the transparent object with the image information of the background image (operation 720 in FIG. 7) in a bitmap area (also called off-screen bitmap since the bitmap is stored in a memory not related to a display or other output device) is now explained with reference to FIG. 11.

Figure 11:
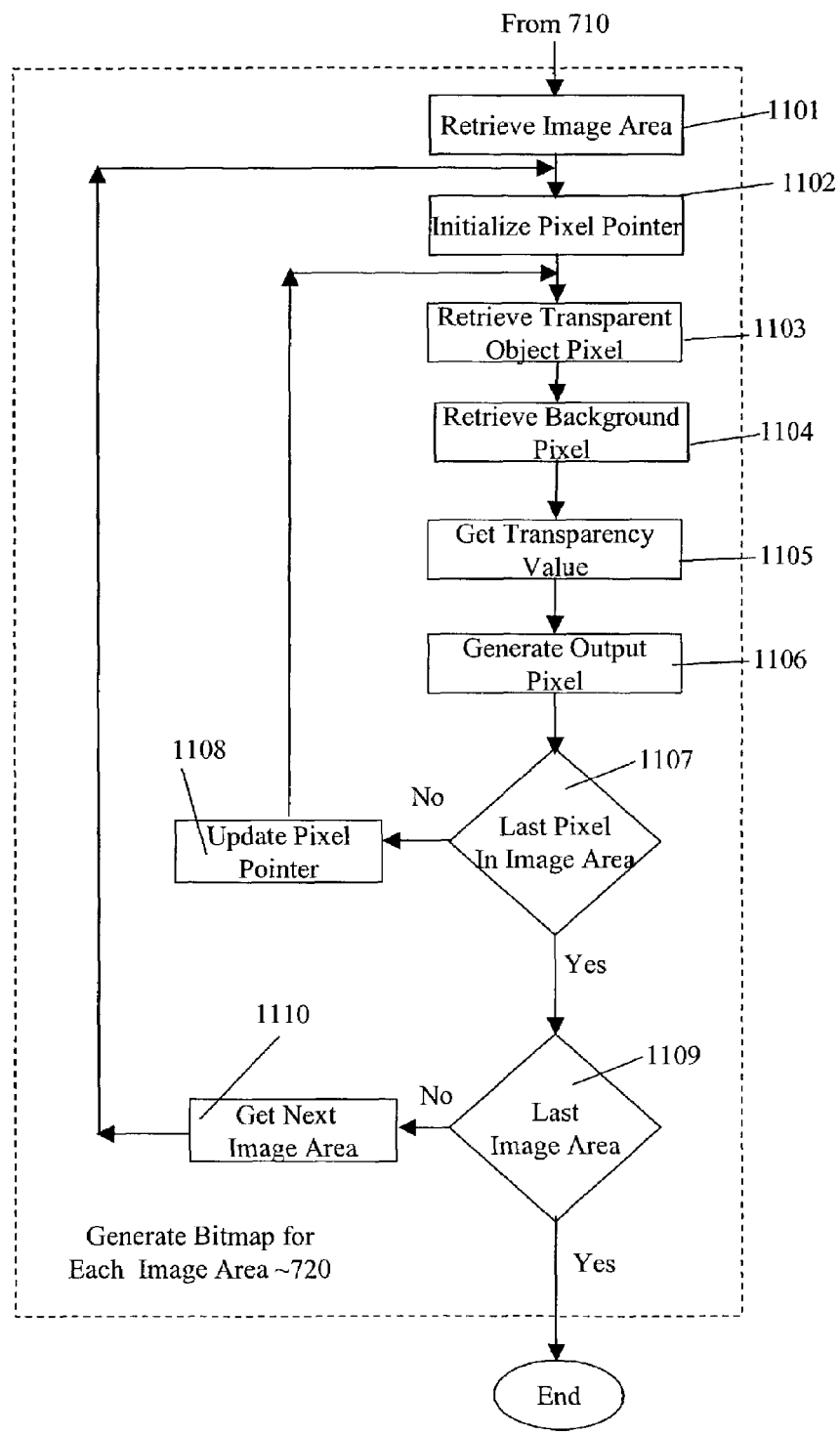
FIG. 11 is a process flow diagram illustrating a process of combining the image information of the transparent object with the image information of a background image according to an embodiment of the present invention.

FIG. 11 is one embodiment of a process flow diagram for generate bitmap for each image area operation 720. In this embodiment, operation 720 utilizes a transparent object bitmap 945 that is stored in memory 610 as object bitmap 645, a background bitmap 943 that is stored in memory 610 as background bitmap 643, and a plurality of image areas 912 that is stored in memory 610 as image areas 642. For convenience and to aid in visualization of this embodiment of the invention, the elements in FIGS. 9A to 9D are referenced below. However, those of skill in the art appreciate that the information referred to for a particular element typically is stored in a memory.

Retrieve image area operation 1101 retrieves a first image area, e.g., image area 1035a, from image areas 642, which is referred to as the current image area. Operation 1101 transfers to initialize pixel pointer operation 1102.

In initialize pixel pointer operation 1102, a first pixel of this image area is detected, and a pixel pointer is initialized to the location of this pixel. Operation 1102 transfers to retrieve transparent object pixel operation 1103.

In retrieve transparent object pixel operation 1103, the pixel addressed by the pixel pointer is retrieved from stored transparent object bitmap 945, i.e. the pixel corresponding to the pixel in the image area is retrieved from object bitmap 645. Operation 1103 transfers to retrieve background pixel operation 1104.

In retrieve background pixel operation 1104, the pixel addressed by the pixel pointer is retrieved from background bitmap 643, i.e. the pixel corresponding to the pixel in the image area is retrieved from background bitmap 643. Operation 1104 transfers to get transparency value operation 1105

In get transparency value operation 1105, the transparency value of the pixel of transparent object 693 is determined. As has been explained above, the transparency of a transparent object pixel is usually encoded as a transparency value ($\alpha$-value) in the image information of the transparent object. If, for example, the image information of one pixel is represented in the (R, G, B, $\alpha$)-form described above, weight value $\alpha$ represents the transparency of the pixel and is retrieved in operation 1105. Operation 1105 transfers to generate output pixel operation 1106.

In generate output pixel operation 1106, the image information of the corresponding pixel at the same position of the background image, i.e., the pixel retrieved in operation 1104, has to be taken into account in generating a respective pixel of the output data of the digital image depending on weight value $\alpha$. The resultant pixel of the output data set is generated in operation 1106 by a combination of the image information of the corresponding transparent object and background pixels.

One embodiment of the pixel combination process of operation 1106 is illustrated by way of an example. Weight value $\alpha$ can assume 256 different values between 0 (completely opaque) and 255 (fully transparent). In this example, weight value $\alpha$ for a particular pixel has a value of 191, which is equivalent to a transparency of $(\alpha+1)/256=0.75$. The intensity values of the three colors of the pixel of the background object have a weight of 0.75 and the respective intensities of the pixel of the transparent object have a weight of 0.25.

If, for example, the intensity value of the red color of the background image is $R_{Bi}=164$ and the corresponding value of the transparent object is $R_{TO}=40$, the red-value of the combined pixel is defined as follows: $R_C=164\times0.75+40\times0.25=133$. The same operation is carried out for the green- and blue-intensity values. A similar operation can be performed for pixel representations other than the (R, G, B, $\alpha$)-representation.

In one embodiment, pixel information obtained by combining the transparent object pixel and the corresponding background pixel is written to the location addressed by the pixel pointer in the current image area within image areas 642. Upon completion of operation 1106, processing transfers to last pixel in image area check operation 1107.

Last pixel in image check operation 1107 determined whether all pixels of the current image area have been reached. If one or more pixels in the current image area remain to be processed, check operation 1107 transfers to update pixel pointer operation 1108 and otherwise to last image area check operation 1109.

Since the first pixel in the current image area is being processed in this example, check operation 1107 transfers to update pixel pointer operation 1108. Update pixel pointer operation 1108 changes the value of the pixel pointer to address the next pixel in the current image area. Operation 1108 transfers to retrieve transparent object pixel operation 1103.

Operations 1103 to 1106 are repeated for the next pixel, in the same manner as described above. Check operation 1107 determines whether all of the pixels in the current image area have been processed, as described above. Thus, operation 720 loops through operations 1107, 1108, and 1103 to 1106 until all the pixels in the current image area have been processed. When all the pixels have been processed, check operation 1107 transfers to last image area check operation 1109.

If all the image areas have been processed, check operation 1109 transfers to the end operation and otherwise to get next image area operation 1110. Get next image area operation 1110 retrieves the next image area, which becomes the current image area, and transfers to operation 1102. Operations 1102 to 1109 are repeated from the next image area. Hence, when all the image areas are processed, the output data of the digital image covered by and including transparent object 693 is processed and included in image areas 642.

Depending upon the location and type of display device, image areas 642 can be provided as a bitmap to a display device driver, copied as a bitmap to a display device memory, or transmitted as a bitmap to a remote device. Image areas 642 are handled as a bitmap upon completion of operation 720. In one embodiment, information in image areas 642, e.g., the plurality of image area bitmaps, is formatted for an output device selected from a printer device, a display device and a memory device. The processing required to generate this bitmap, the memory area required to store this bitmap, and the network bandwidth required for transmission of this bitmap is significantly reduced relative to the prior art bitmaps associated with transparent objects.

Figure 12:
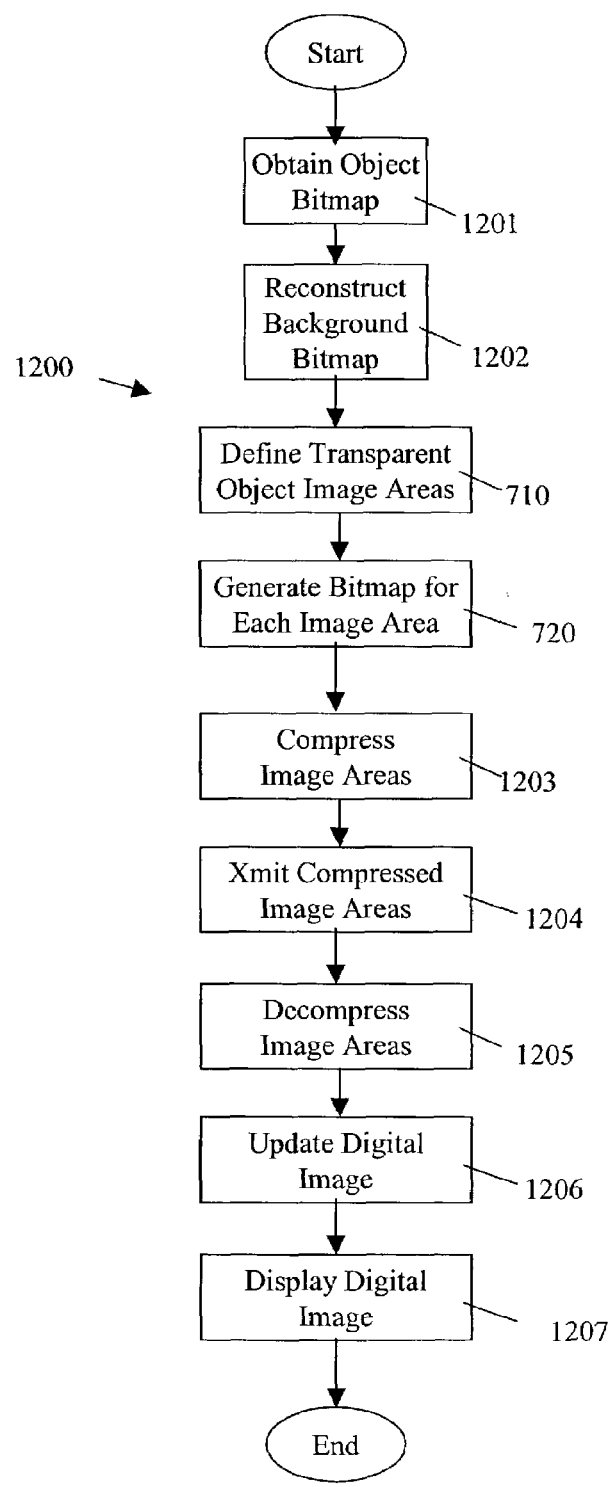
FIG. 12 is a process flow diagram illustrating a method of preparing and outputting output data of a digital image according to a further embodiment of the present invention.

A further embodiment of a method of generating output data of a digital image with a transparent object according to another embodiment of the present invention is illustrated in FIG. 12. In obtain object bitmap operation 1201, an object bitmap of a transparent object is obtained from input command data of the transparent object. An object bitmap 945 of transparent object 693 (FIG. 6B) is schematically shown in FIG. 9A. Again, in this embodiment, object bitmap 945 is stored as object bitmap 645 in memory 610 of computer device 600.

Object bitmap 945 is a representation of the image information of transparent object 693 in digital image 690. The image information of every pixel may be encoded in the (R, G, B, α)-form or in any other suitable data format. The image information may be represented by ASCII characters. The image information of one pixel typically includes between one byte (gray scale image) and eight bytes (high resolution color representation). The uncompressed bitmap of a high-resolution color digital picture therefore contains a large amount of data. Operation 1201 transfers to reconstruct background bitmap operation 1202.

In reconstruct background bitmap operation 1202, a bitmap of the background image is created in a memory device. For this purpose, the list of display commands of digital image 690, which is for example stored in a metafile, is used. The list of display commands contains all image information of the background image not including the newly created transparent object.

Examples of display commands contained in the list of display commands are given in pseudo code as follows:

rectangle (44, 57; 20, 100)

line (15, 240; 15, 420)

circle (185, 225; 33)

The rectangle is represented by the coordinates of the upper left hand corner and the length and width of the rectangle, a line by the coordinates of the start and endpoints, and a circle by the center coordinates and the radius. The shown display commands are an example of a polygon representation of image objects. This embodiment of the present invention, however, is not restricted to any particular form of the display command, and of course, other representations may be possible.

Using the information of these display commands, operation 1202 generates a background bitmap in a memory, e.g. a memory area 643 of a computer random access memory 610, a memory area of a chipcard, a memory of a wireless device or any other suitable memory device. An example of background bitmap 943 of the digital image 690 (FIG. 6B) is shown in FIG. 9D. Background bitmap 943 contains all information of the digital image with the exception of the transparent object itself. Operation 1202 transfers to operation 710.

As explained above and incorporated herein by reference, in operation 710, a plurality of rectangular image areas is formed, which together cover the display area of transparent object 693. A plurality of rectangular image areas 912 covering the area of transparent object 693 is shown in FIG. 9C. As explained above, operation 710 transfers to operation 720.

In operation 720, as described above and incorporated herein by reference, the image information of transparent object 693 is combined with the image information of the background image in each image area of rectangular image areas 642 stored in computer memory 610. The result of this combination process is a plurality of image areas 642 containing the correct output image information of the respective image area. Operation 720 transfers to compress image areas 1203.

In compress image areas operation 1203, the image data contained in image areas 642 are compressed. Any of the standard compression techniques for pixel data may be used. Operation 1203 transfers to transmit compressed image areas operation 1204.

Transmit compressed image areas operation 1204 sends the compressed image areas to an output device. Upon receipt of the compressed image areas at the output device, decompress image areas operation 1205 is initiated at the output device.

In decompression image areas operation 1205, the image data are decompressed to generate the combined data in the bitmap image areas and processing transfers to update digital image operation 1206. In update operation 1206, the data of the bitmap image areas replace the image information of the respective image areas of the background image already present in the output device. Hence, a complete digital image of the transparent object is correctly constructed without irregularities and displayed in display digital image operation 1207.

Hence, in the embodiment of the invention, the storage as a bitmap, combination processing, and transfer to the output device as pixel data are only performed for the image area of the transparent object. The storage, processing, and bandwidth requirements are therefore reduced considerably relative to the prior art processes.

For a PostScript file having a typical display size and resolution, the file size of the digital image represented as a bitmap may be up to 30 MB. If the transparent object only covers a small part of the total image, the image area rendered is reduced substantially using embodiments of the present invention. Accordingly, the amount of data to be stored, processed, and transmitted can be reduced up to 1/1000 of the amount necessary when rendering the complete image area.

Those skilled in the art will readily recognize that the individual operations mentioned before in connection with method 630 and/or method 1200 of the present invention can be performed by executing computer program instructions on CPU 601 of computer system 600. However, in another embodiment, dedicated electronic circuits can be configured such that they perform the individual operations explained before in connection with method 630. In another embodiment, a storage medium has thereon installed computer-executable program code, and execution of the computer-executable program code causes the CPU of a computer to perform the individual operations explained above.

In one embodiment, method 630 is executed on a hardware configuration like a personal computer or workstation as illustrated schematically in FIG. 6A by computer system 600. However, method 630 may also be executed on a client-server configuration 650 that also is illustrated in FIG. 6A. The digital image may be displayed on a display screen of client device 600 while some or all operations of method 630 are carried out on a server computer 680 accessible by the client device 600 over a data network 604, such as the Internet, using a browser application or the like.

Herein, a computer program product comprises a medium configured to store or transport computer readable code for method 630 or in which computer readable code for method 630 is stored. Some examples of computer program products are CD-ROM discs, ROM cards, floppy discs, magnetic tapes, computer hard drives, servers on a network and signals transmitted over a network representing computer readable program code.

As illustrated in FIG. 6A, this storage medium may belong to computer system 600 itself. However, the storage medium also may be removed from computer system 600. For example, method 630 may be stored in memory 684 that is physically located in a location different from processor 601. The only requirement is that processor 601 is coupled to the memory containing method 630. This could be accomplished in a client-server system 650, e.g. system 600 is the client and system 680 is the server, or alternatively via a connection to another computer via modems and analog lines, or digital interfaces and a digital carrier line.

For example, memory 684 could be in a World Wide Web portal, while display unit 616 and processor 601 are in a personal digital assistant (PDA), or a wireless telephone, for example. Conversely, the display unit and at least one of the input devices could be in a client computer, a wireless telephone, or a PDA, while the memory and processor are part of a server computer on a wide area network, a local area network, or the Internet.

More specifically, computer system 600, in one embodiment, can be a portable computer, a workstation, a two-way pager, a cellular telephone, a digital wireless telephone, a personal digital assistant, a server computer, an Internet appliance, or any other device that includes the components shown and that can execute method 630. Similarly, in another embodiment, computer system 600 can be comprised of multiple different computers, wireless devices, cellular telephones, digital telephones, two-way pagers, or personal digital assistants, server computers, or any desired combination of these devices that are interconnected to perform, method 630 as described herein.

Herein, a computer memory refers to a volatile memory, a non-volatile memory, or a combination of the two in any one of these devices. Similarly, a computer input unit and a display unit refer to the features providing the required functionality to input the information described herein, and to display the information described herein, respectively, in any one of the aforementioned or equivalent devices.

In view of this disclosure, method 630 and method 1200 that included method 630 can be implemented in a wide variety of computer system configurations using an operating system and computer programming language of interest to the user. In addition, method 630 and/or method 1200 could be stored as different modules in memories of different devices. For example, method 630 could initially be stored in a server computer 680, and then as necessary, a module of method 630 could be transferred to a client device 600 and executed on client device 600. Consequently, part of method 630 would be executed on the server processor 682, and another part of method 630 would be executed on processor 601 of client device 600. Also, FIG. 6A shows input devices 615 and 618, but other input devices, such as speech recognition software and/or hardware could be used to input the selections and data for method 630.

In yet another embodiment, method 630 is stored in memory 684 of system 680. Stored method 630 is transferred, over network 604 to memory 611 in system 600. In this embodiment, network interface 683 and I/O interface 602 would include analog modems, digital modems, or a network interface card. If modems are used, network 604 includes a communications network, and method 630 is downloaded via the communications network.

Method 630 may be implemented in a computer program including comprehensive office application STAROFFICE that is available from Sun Microsystems, Inc. of Palo Alto, Calif. (STAROFFICE is a trademark of Sun Microsystems.) Such a computer program may be stored on any common data carrier like, for example, a floppy disk or a compact disc (CD), as well as on any common computer system's storage facilities like hard disks. Therefore, one embodiment of the present invention also relates to a data carrier for storing a computer program for carrying out the inventive method. Another embodiment of the present invention also relates to a method for using a computer system for carrying out method 630. Still another embodiment of the present invention relates to a computer system with a storage medium on which a computer program for carrying out method 630 is stored.

While method 630 hereinbefore has been explained in connection with one embodiment thereof, those skilled in the art will readily recognize that modifications can be made to this embodiment without departing from the spirit and scope of the present invention. It is, for example, readily apparent to those skilled in the art that the present invention can be applied to the printing of any document containing transparent graphics.

In still another embodiment, method 630 is included in a tool for printing documents containing transparent graphics objects and any other objects which either overlap or do not overlap with the transparent graphics objects by dealing with those objects as explained in detail in the foregoing description. Only for exemplary purposes, one embodiment of the invention has been described by referring to non-transparent objects, which may overlap or may not overlap with the transparent graphics objects. It is, however, clear to the expert that those overlapping or non-overlapping objects can also take the form of any non-transparent objects including text.

While the invention has been shown with reference to the particular embodiments thereof, it will be understood by those skilled in the art that various other changes in the form and details may be made therein without departing from the spirit and scope of the invention. A further implementation of one embodiment of the present invention provides a method of generating a digital image including a transparent object, the method includes defining a plurality of image areas which together cover the area of transparent object and combining in the plurality of image areas an image information of the transparent object with an image information of a background image not including the transparent object.

The method may further include obtaining the image information of the transparent object from an object bitmap and/or the obtaining image information of the background image from a background bitmap. A background bitmap may be obtained by using a stored output command list of the digital image. The method may include generating a plurality of rectangular bitmaps using a mask bitmap masking the area of the transparent object. The generating operation may include horizontally scanning the mask bitmap, detecting the start and end positions of the masked area of the mask bitmap and putting together the pixels of adjacent lines having common start and end positions.

A still further implementation of an embodiment of the present invention provides a computer system for generating output data for a digital image including a transparent object, the computer system includes means for defining a plurality of image areas which together cover the area of the transparent object, and means for combining, in the plurality of image areas, an image information of the transparent object with an image information of a background image not including the transparent object.

We claim:

1. A computer-implemented method comprising:
   obtaining image information of a transparent object in a digital image from a transparent object bitmap wherein said transparent object bit map comprises a plurality of pixels and each pixel has encoded therein a transparency weight for that pixel
   creating a plurality of image areas,
      wherein said plurality of image areas cover a total area of the transparent object; and
      each image area covers a different portion of said transparent object;
   combining, pixel-by-pixel, pixels of said transparent object covered by an image area with pixels of a background image of said digital image also covered by said image area wherein said background image does not include said transparent object, wherein said combining includes using a transparency weight of a pixel from said transparency object bitmap together with a weight for a corresponding pixel of said background image to create combined pixel information that is a combination of both of pixel information of said transparent object and pixel information of said background image; and
   storing said combined pixel information in said image area.

2. The computer-implemented method of claim 1 wherein each image area in said plurality of image areas is a rectangular area.

3. The computer-implemented method of claim 2 wherein said rectangular area is created by covering only pixels of said transparent object.

4. The computer-implemented method of claim 1 wherein said creating a plurality of image areas comprises:
   creating a number of image areas in said plurality of image areas wherein said number is a smallest number of image areas needed to cover only pixels of said transparent object.

5. The computer-implemented method of claim 1 wherein said plurality of image areas is created by covering only pixels of said transparent object.

6. The computer-implemented method of claim 1 wherein said creating a plurality of image areas comprises:
   using a mask bitmap having a masked area masking the area of the transparent object.

7. The computer-implemented method of claim 6 wherein said creating a plurality of image areas comprises:
   horizontally scanning the mask bitmap, and detecting start positions and end positions of the masked area in lines of the mask bitmap.

8. The computer-implemented method of claim 7 wherein said creating a plurality of image areas comprises:
   putting together pixels of adjacent lines having a common start position and a common end position to form an image area.

9. The computer-implemented method of claim 6 wherein the masked area of the mask bitmap is comprised of black pixels and a remaining area is comprised of white pixels.

10. The computer-implemented method of claim 1 further comprising:
    obtaining the image information of the background image from a background bitmap.

11. The computer-implemented method of claim 10 further comprising:
    generating said background bitmap using an output command list of the digital image.

12. The computer-implemented method of claim 1, wherein a weight of a pixel of the transparent object an a weight of a respective pixel of the background image are determined by said transparency weight encoded in said pixel of the transparent object.

13. The computer-implemented method of claim 1 further comprising:
    compressing an image area after completing said combining for said image area.

14. A computer system for generating output data for a digital image including a transparent object, the computer system comprising:
    a processing unit; and
    a memory coupled to said processing unit, and storing instructions, wherein execution of said instructions by said processing unit results in a method comprising
       obtaining image information of a transparent object in a digital image from a transparent object bitmap wherein said transparent object bit map comprises a plurality of pixels and each pixel has encoded therein a transparency weight for that pixel
       creating a plurality of image areas,
          wherein said plurality of image areas cover a total area of the transparent object; and
          each image area covers a different portion of said transparent object;
       combining, pixel-by-pixel, pixels of said transparent object covered by an image area with pixels of a background image of said digital image also covered by said image area wherein said background image does not include said transparent object, wherein said combining includes using a transparency weight of a pixel from said transparency object bitmap together with a weight for a corresponding pixel of said background image to create combined pixel information that is a combination of both of pixel information of said transparent object and pixel information of said background image; and
       storing said combined pixel information in said image area.

15. The computer system of claim 14 wherein each image area in said plurality of image areas is a rectangular area.

16. The computer system of claim 15 wherein said rectangular area is created by covering only pixels of said transparent object.

17. The computer system of claim 14 wherein said creating a plurality of image areas comprises:
creating a number of image areas in said plurality of image areas wherein said number is a smallest number of image areas needed to cover only pixels of said transparent object.

18. The computer system of claim 14 wherein said plurality of image areas is created by covering only pixels of said transparent object.

19. The computer system of claim 14 wherein said creating a plurality of image areas comprises:
using a mask bitmap having a masked area masking the area of the transparent object.

20. The computer system of claim 19 wherein said creating a plurality of image areas comprises:
horizontally scanning the mask bitmap, and detecting start positions and end positions of the masked area in lines of the mask bitmap.

21. The computer system of claim 20 wherein said creating a plurality of image areas comprises:
putting together pixels of adjacent lines having a common start position and a common end position to form an image area.

22. The computer system of claim 19 wherein the masked area of the mask bitmap is comprised of black pixels and a remaining area is comprised of white pixels.

23. The computer system of claim 14 wherein said method further comprises:
obtaining the image information of the background image from a background bitmap.

24. The computer system of claim 23 wherein said method further comprises:
generating said background bitmap using an output command list of the digital image.

25. The computer system of claim 14, wherein a weight of a pixel of the transparent object and a weight of a respective pixel of the background image are determined by the transparency weight encoded in said pixel of the transparent object.

26. The computer system of claim 14 wherein said method further comprises:
compressing an image area after completing said combining for said image area.

27. A computer program product having stored thereon computer readable instructions wherein execution of said computer readable instructions results in a method comprising:
obtaining image information of a transparent object in a digital image from a transparent object bitmap wherein said transparent object bit map comprises a plurality of pixels and each pixel has encoded therein a transparency weight for that pixel creating a plurality of image areas,
wherein said plurality of image areas cover a total area of the transparent object; and
each image area covers a different portion of said transparent object;

combining, pixel-by-pixel, pixels of said transparent object covered by an image area with pixels of a background image of said digital image also covered by said image area wherein said background image does not include said transparent object, wherein said combining includes using a transparency weight of a pixel from said transparency object bitmap together with a weight for a corresponding pixel of said background image to create combined pixel information that is a combination of both of pixel information of said transparent object and pixel information of said background image; and storing said combined pixel information in said image area.

* * * * *